United States Patent [19]

Vetter

[11] 3,948,335

[45] Apr. 6, 1976

[54] MOTORCYCLE SIDECAR MOUNTING APPARATUS AND METHOD

[75] Inventor: Craig W. Vetter, Rantoul, Ill.

[73] Assignee: Vetter Design Works, Inc., Rantoul, Ill.

[22] Filed: Jan. 16, 1975

[21] Appl. No.: 541,406

[52] U.S. Cl. ............................. 180/25 R; 280/203
[51] Int. Cl.² ........................................ B62K 27/12
[58] Field of Search .......... 280/203, 209; 180/33 A, 180/30, 33 R, 25

[56] References Cited
UNITED STATES PATENTS

| | | | |
|---|---|---|---|
| 1,383,847 | 7/1921 | Perkins | 280/203 |
| 1,448,039 | 3/1923 | Powell et al. | 280/203 |
| 2,797,933 | 7/1957 | Aldous | 280/203 |
| 3,710,883 | 1/1973 | Rizzo | 180/33 R |
| 3,754,612 | 8/1973 | Watanabe | 180/33 B |

*Primary Examiner*—Kenneth H. Betts
*Attorney, Agent, or Firm*—Wegner, Stellman, McCord, Wiles & Wood

[57] ABSTRACT

Apparatus for mounting a sidecar to a motorcycle having a vertically disposed trapezoid-shaped frame section comprised of elongate struts interconnected at their ends defining a first vertex adjacent the motorcycle seat cushion and second and third vertices substantially below and in front of the first vertex includes three mounting bracket plates that are secured to the frame adjacent the three vertices, respectively. In one embodiment, three mounting brackets overlie two struts of the frame adjacent the vertex and are respectively clamped thereto by U-bolts. In another embodiment, a front engine mount of the motorcycle adjacent the third vertex is replaced by a mounting bracket plate which is secured to both the engine block and a frame member. Each mounting bracket plate carries the male portion of a clevispin connector for releasably attaching the sidecar to the mounting bracket plates.

10 Claims, 5 Drawing Figures

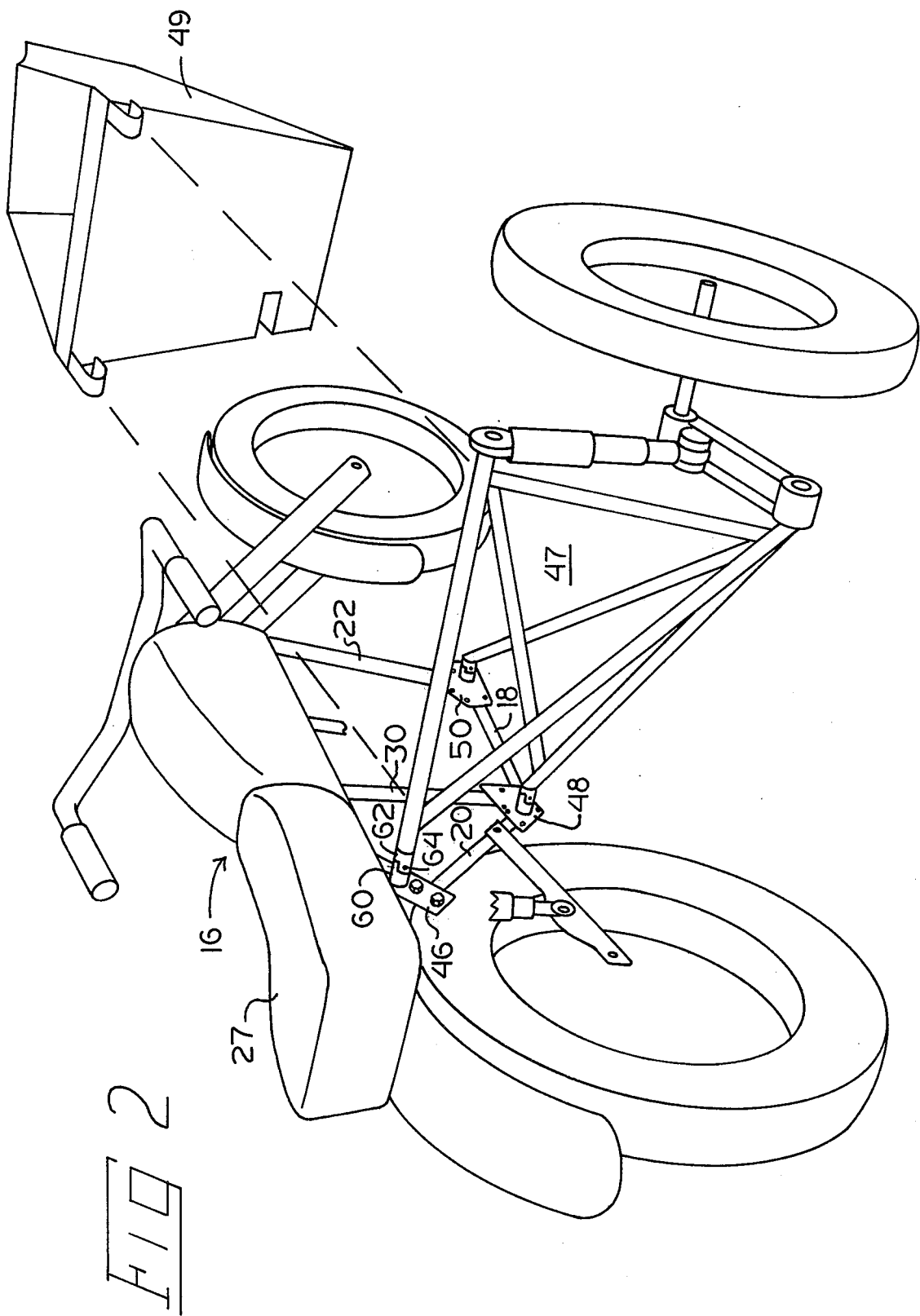

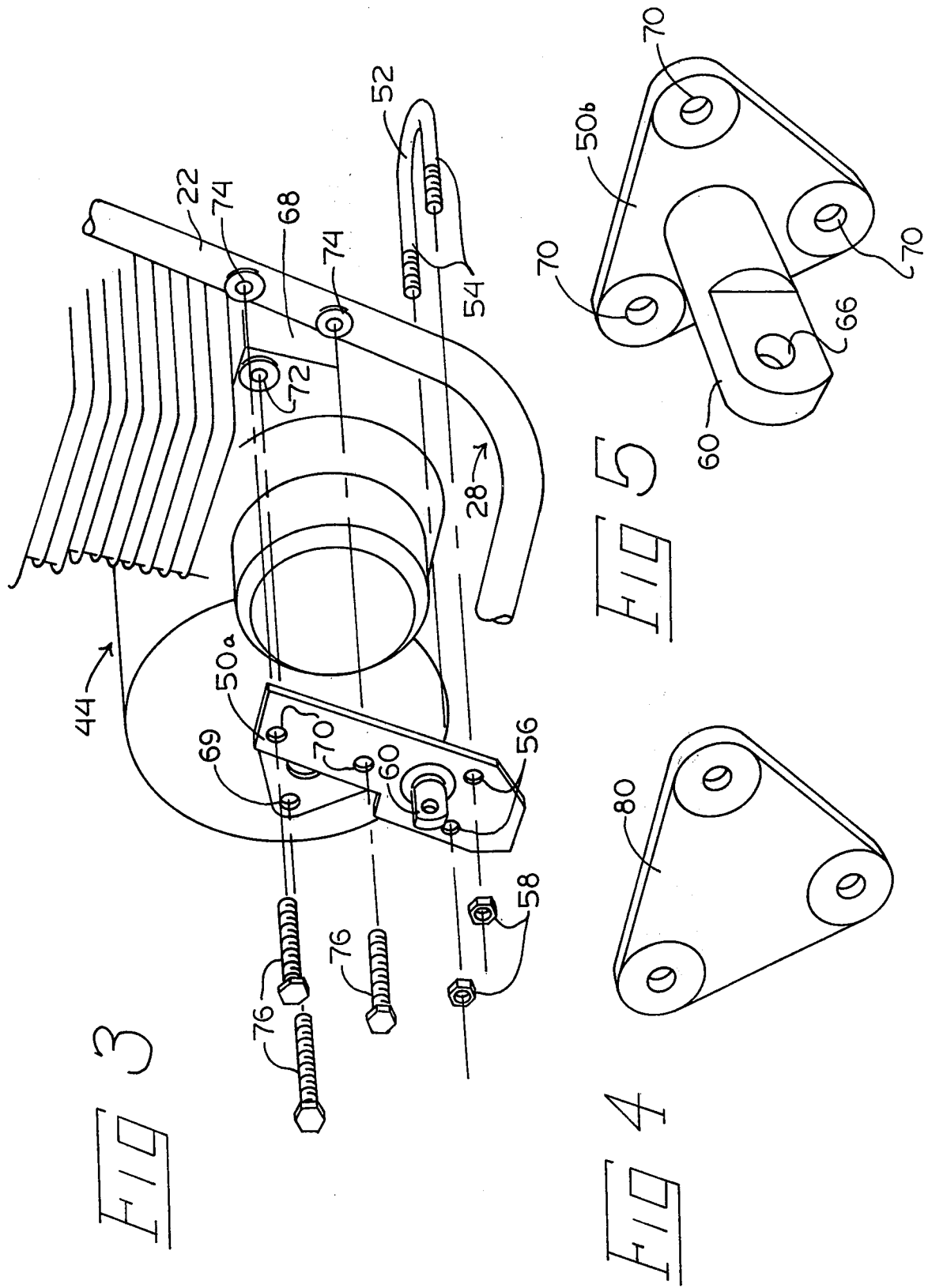

MOTORCYCLE SIDECAR MOUNTING APPARATUS AND METHOD

BACKGROUND OF THE INVENTION

This invention relates to apparatus for mounting a sidecar to a motorcycle having a trapezoid frame section.

Present-day motorcycles are provided with frames including a vertically disposed, trapezoid-shaped section 10 of the type shown in FIG. 1 of the drawings. The trapezoid frame section is defined by a plurality of interconnected struts including an elongate upper strut 12 extending from the rear 14 to the front 16 of the motorcycle, a lower strut 18, a rear diagonal strut 20 and a front diagonal strut 22. Lower strut 18 is beneath and substantially parallel to upper strut 12. Rear diagonal strut 20 extends between the respective back ends of upper strut 12 and lower strut 18. Front diagonal strut 22 extends between the respective front ends of upper strut 12 and lower strut 18.

The junctures of the various struts define a first vertex 24 of the trapezoid, a second vertex 26 and a third vertex 28. The juncture of the rear diagonal strut 20 and the upper strut 12 defines first vertex 24 adjacent a seat cushion 27. Rear diagonal strut 20 and front diagonal strut 22 respectively define, with lower strut 18, second and third vertices 26 and 28. Vertices 26 and 28 are both substantially below and in front of first vertex 24 and are aligned parallel with upper strut 12. An intermediate diagonal strut 30 extends from adjacent the second vertex 26 to a point on the upper strut 12 in front of second vertex 26.

The remaining parts of the motorcycle are mounted to frame section 10. A rear wheel 32 is secured to the rear diagonal strut 20 by means of a swing arm suspension system including a pivotally mounted swing arm 34 and a dashpot shock absorber 36. A steering column 38 is mounted within a bearing housing 39 which is secured to an extension of front diagonal strut 22. A front wheel assembly 40 is rotatably mounted at the free end of a fork assembly 42 which is carried by steering column 38. An engine 44 is mounted to the frame between intermediate diagonal strut 30 and front diagonal strut 22. Other parts of the motorcycle, not shown, such as a gas tank, fenders, etc., are also carried by the frame.

In addition to engine 44, the gas tank and other parts of the motorcycle, the frame must carry the load of the motorcycle rider and sometimes a passenger and luggage. Known arrangements for mounting a sidecar to a motorcycle attach the sidecar to the motorcycle at various locations on the frame. A sidecar, when mounted to the frame, further increases the load forces that are applied thereto.

The points on the trapezoid frame section at which the sidecar is connected is a matter of great importance. The foremost consideration in selecting the connection points is that the additional sidecar load forces applied to the frame may be sufficiently great to misalign and bend the frame elements depending upon the locations on the frame at which they are applied. A further consideration in locating the connection points of a mounting apparatus is the spacing between connection points. The greater the distance between connection points, the greater the mechanical advantage of the connectors in resisting forces tending to pivot apart the sidecar and the motorcycle. Yet another consideration in selecting a mounting apparatus arrangement of connection points on the trapezoid frame is the extent such locations facilitate attachment of mounting brackets or the like to the frame members. Likewise, the connection points should enable the use of mounting brackets which do not require permanent alteration or permanent attachment to the frame, or which weaken the frame. The connectors should not interfere with the comfortable seating and leg positioning of the rider or passenger. Preferably, to minimize costs and to facilitate sidecar attachment to, and detachment from, the motorcycle, the number of connection points should be minimized. Moreover, the location of the connection points should be selected so as not to interfere with the provision of a wheel suspension system for the motorcycle.

Known apparatus for mounting a sidecar to a trapezoid-shaped frame section lack many of the advantageous characteristics noted above. For example, in one known mounting apparatus, connections to the rear and front diagonal struts intermediate their ends have resulted in these frame members being bent by sidecar forces.

SUMMARY OF THE INVENTION

The disadvantages of known apparatus for mounting a sidecar to a motorcycle having a trapezoid-shaped frame section are overcome and the advantageous characteristics noted above are provided in the sidecar mounting apparatus of the present invention in which three connectors are respectively attached to the trapezoid frame section adjacent the first, second and third vertices thereof. The locations of these three vertices at the juncture of at least two interconnected struts are points of maximum strength of the frame. Further, because the second and third vertices are substantially below and in front of the first vertex, these connection points provide a substantial mechanical advantage in resisting forces tending to pivot the sidecar and motorcycle apart over known connection points which are more closely spaced. The connectors do not prevent either the rider or the passenger from locating his leg in the customary riding position with his feet resting on the foot pedals customarily provided on motorcycles, and do not interfere with the use of the customary rear wheel swing arm suspension system found on most motorcycles.

Each of the three connectors comprises a mounting bracket that is rigidly secured to the frame adjacent a respective one of the vertices and carries means for releasably attaching the sidecar to the mounting bracket. Each of the mounting brackets is separately secured to two struts or one strut and an engine block, which itself is connected to another strut. Because of this mounting arrangement, sidecar forces applied through the attaching means are distributed to two or more struts of the frame. The releasable attaching means carried by each mounting bracket facilitates mounting the sidecar to the motorcycle and allows detachment therefrom without the necessity of removing the mounting brackets.

An object of the invention is to provide a mounting apparatus for a motorcycle having a trapezoid frame which does not require permanent alteration of the frame by adding bolt holes or the like through the struts which substantially weakens the frame. It is known to secure a mounting bracket to the frame by clamping it along the length of a single strut by means of U-bolts or the like. The disadvantage of using a clamp of this type along a single strut is that the clamp depends solely on friction to resist forces tending to rotate it around the strut and forces tending to move it longitudinally along the strut. This disadvantage is overcome in one embodiment of the mounting apparatus in which each of the connectors includes a plate that overlies and is separately secured to two struts by U-bolts. Since the two struts adjacent one of the three vertices are not in alignment with one another, the U-bolts provide bearing forces that prevent rotation or longitudinal movement of the brackets.

Some motorcycles are provided with an engine mount securing the engine to the frame adjacent the third vertex, and preexisting bolt holes for the engine mount are located in one of the struts defining the third vertex. In accordance with another embodiment of the invention, the engine mount is removed and a mounting bracket is secured to the engine block and the frame in place of the engine mount with the bolt holes therefor being utilized to secure the mounting bracket to the frame.

Another advantage of the invention is that the improved strength of the sidecar mounting apparatus eliminates the need for further connectors other than those provided at the first, second and third vertices.

Further, the attaching means for the brackets of the second and third vertices are at the same vertical level and are releasably attached to the sidecar by horizontal pin connections. This, together with the minimum number of connectors, further simplifies the mounting procedure.

The foregoing features and advantages will be made more apparent, and further features and advantages will be discussed in the description of the preferred embodiments.

BRIEF DESCRIPTION OF THE DRAWINGS

The following description of the preferred embodiments is given in conjunction with the drawings in which:

FIG. 2 is a perspective view of a motorcycle with a sidecar attached thereto by means of the sidecar mounting apparatus of the present invention;

FIG. 3 is a perspective view of a mounting bracket of another embodiment of the sidecar mounting apparatus which is secured to an engine block and one of the motorcycle frame struts in place of an engine mount;

FIG. 4 is a perspective view of an engine mount; and

FIG. 5 is a perspective view of a mounting bracket of a further embodiment of the sidecar mounting apparatus designed to replace the engine mount shown in FIG. 4.

DESCRIPTION OF THE PREFERRED EMBODIMENTS

Figure 1:
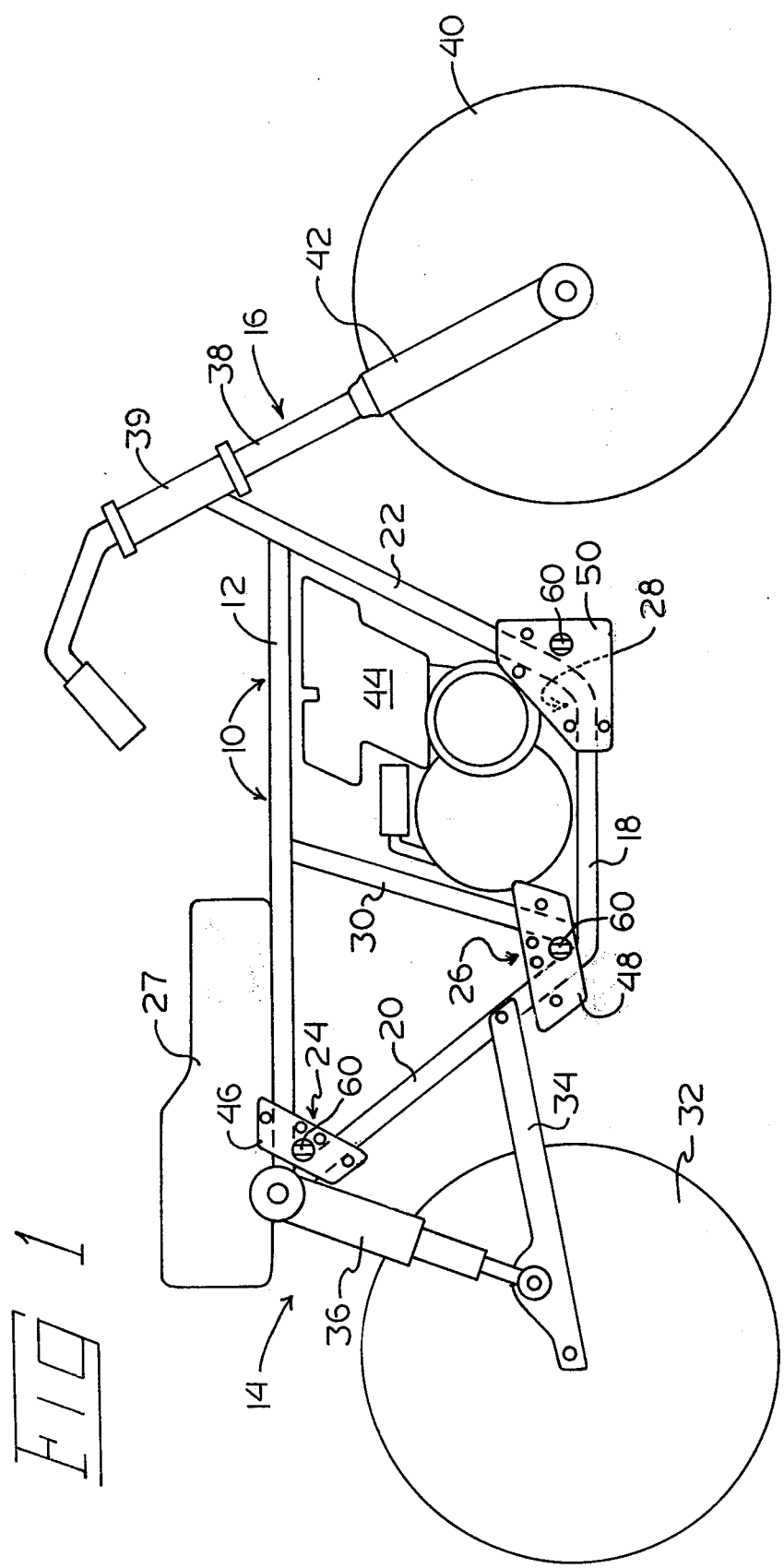
FIG. 1 is a side view of a motorcycle with a trapezoid-shaped frame section with mounting brackets of the sidecar mounting apparatus secured thereto adjacent the first, second and third vertices.

Referring to FIG. 1, an embodiment of the sidecar mounting apparatus is seen to include three connectors 46, 48 and 50, which are respectively secured to motorcycle frame section 10 at first vertex 24, second vertex 26 and third vertex 28. Each of the mounting brackets is a flat plate which spans two of the frame struts adjacent one of the three vertices and thereby distributes sidecar forces between two or more struts. Mounting bracket plate 24 overlies upper strut 12 and rear diagonal strut 20. Mounting bracket plate 48 spans rear diagonal strut 20 and intermediate diagonal strut 30, but it should be appreciated that it could be designed to span rear diagonal strut 20 and lower strut 18. Front mounting bracket plate 50 overlies both lower strut 18 and front diagonal strut 22.

Each of the mounting bracket plates is separately secured to each of the frame struts spanned thereby by means of U-bolts 52, as best seen in FIG. 3. Two pairs of bolt holes 56 are provided in each mounting bracket plate with the two struts spanned by the plate respectively located therebetween. The mounting bracket plates 46, 48 and 50 overlie the struts on one side of the frame and legs 54 of the U-bolts 52 are inserted through their associated pair of bolt holes 56 from the other side of the frame with the struts between legs 54. After each U-bolt 52 has been inserted, nuts 58 are tightly screwed onto the threaded ends of lets 54 to rigidly secure the mounting bracket plate to the strut therebetween. The tightening action of nuts 58 clamps the strut between the back of the U-bolt and a portion of the mounting bracket plate.

As best seen in FIG. 1, each mounting bracket plate is secured to the frame by two U-bolts 52, respectively securing the plate to the two struts spanned thereby. Because each mounting bracket plate is secured separately to two different struts which are not in alignment, the frictional forces provided by the U-bolt assembly need not be relied on to secure the mounting bracket plates against either sliding motion along or rotary motion around a strut. The bearing forces of U-bolt 52 and nuts 58 prevent this type of movement. Thus, the mounting brackets are secured to the frame by securing elements which do exert bearing forces in addition to frictional forces, but which do not require the addition of bolt holes which weaken the frame.

Each of the mounting bracket plates carries a male member 60 for releasably attaching the sidecar to the mounting bracket plate, as best seen in FIG. 5. Referring to FIG. 2, the sidecar is provided with three clevis connectors 62 which mate with the respective male connectors 60 and are secured thereto by means of pins 64 extending through aligned pinholes 66 in the clevis 62 and male connector 60.

The sidecar mounting apparatus is particularly suited for the tetrahedron-shaped sidecar frame shown in FIG. 2, but is not limited to use with such a frame. However, as explained in my copending application directed to this tetrahedron-shaped frame, Ser. No. 499,969, filed Aug. 22, 1974, entitled "Sidecar Frame" and assigned to the assignee of the present invention, another advantage of the mounting apparatus having connection points adjacent the first vertex 24 and second vertex 26 of frame section 10 is that the rear diagonal strut 20 serves as the seventh strut of the tetrahedron-shaped sidecar frame 47 which adds to its strength and rigidity.

The clevis pin connection is of course a pivotal connection, and the pivot axes thereof are substantially parallel to the elongate axis of the frame section. Further, the horizontal pivot axes of male connector 60 of mounting brackets 48 and 50 are aligned with one another at the same vertical level. This advantageously facilitates adjusting the leanout of the motorcycle. As explained in my copending application Ser. No. 520,643, filed Nov. 4, 1974, entitled "Adjustable Motorcycle Sidecar Mounting Apparatus", and assigned to the assignee of the present invention, with connectors at these three locations, the motorcycle leanout may be adjusted by altering the effective length of the connector attached to mounting bracket plate 46 adjacent first vertex 24. The location of mounting bracket plate 46 adjacent the first vertex 24 is readily accessible by the motorcycle rider or his passenger so that the leanout may be easily adjusted manually.

Locating the male connectors 60 adjacent the second and third vertices 26 and 28 at the same vertical level also simplifies the mounting procedure. Because the connectors are at the same level, they may be simultaneously mated with and secured to the associated clevises 62 on the sidecar. Separate vertical alignment of the male connectors 60 and clevises 62 is not required. The single remaining male connector 60 adjacent the first vertex 24 need not be mated with its clevis simultaneously with the mating of the aligned connector. After the aligned connectors 60 are pinned to their associated clevises 62, the remaining connector adjacent the first vertex may be pivoted into mating engagement with its clevis and pinned. By this arrangement, the necessity of simultaneously aligning three or more connectors before any of them can be joined is avoided.

Referring to FIG. 3, a front mounting bracket 50a of another embodiment of the sidecar mounting apparatus is shown that is secured to an engine block 68 of engine 44 and the front diagonal strut 22. The top portion of the mounting bracket 50a has one bolt hole 69 and a pair of bolt holes 70 which are respectively aligned with an internally threaded bolt hole 72 in the engine block and to a pair of internally threaded bolt eyelets 74 provided in the front diagonal strut 22. The bolt hole 72 and eyelet 74 are customarily provided by the motorcycle manufacturer to secure the engine block to the frame by means of an engine mount (not shown) of substantially the same shape as the top portion of mounting bracket plate 50a containing bolt holes 70. The engine mount, like the mounting bracket plate 50a, is secured to the engine block and front diagonal strut 22 by means of bolts 76 extending through bolt holes 69 and 70 and screwed into the respective bolt holes 72 and eyelets 74 aligned therewith. Mounting bracket plate 50a, like all the other mounting bracket plates 50, carries a male connector member 60 which is located beneath bolt holes 70. A part of mounting bracket plate 50a extending downwardly beneath male connector 60 has a pair of bolt holes 56 for clamping it to front diagonal strut 20 by a U-bolt 52, as previously explained. The male connector 60 is carried by this downwardly extending part so that it may be located more closely adjacent to third vertex 28. Mounting bracket plate 50 is utilized with motorcycles in which the normal location of the engine mount is substantially above the third vertex.

The location of the front engine mount is not always substantially above the third vertex 28 on all motorcycles. For these motorcycles, the mounting bracket plate to be secured between the frame and the engine block 68 in place of the front engine mount need not be provided with a downwardly extending portion for carrying the male connector member 60. Thus, as seen in FIG. 5, in another embodiment, a mounting bracket 50b to be secured to an engine block and motorcycle frame in lieu of an engine mount 80 shown in FIG. 4 which is normally located on a motorcycle of this type adjacent the third vertex 28, carries the male connector 60 between bolt hole 69 and the pair of bolt holes 70.

The engine 44 is secured to the motorcycle frame at other points thereon by engine mounts in addition to the one replaced by mounting brackets 50a and 50b. Thus, as with the other mounting brackets, sidecar forces applied thereto are distributed between two or more of the motorcycle frame struts. Mounting brackets 46 and 48 are used in combination with mounting brackets 50a and 50b and, thus, again no alteration need be made to the frame in order to mount the sidecar to the motorcycle. The sidecar is mounted to the motorcycle by securing the mounting brackets 46 and 48 to the frame adjacent first and second vertices 24 and 26, removing the front engine mount, replacing it with the appropriate substitute mounting bracket 50a or 50b, and then attaching the sidecar to the male connectors 60 carried by the respective mounting brackets.

I claim:

1. In a motorcycle having a rear wheel swing arm suspension system and a vertically disposed frame including a trapezoid-shaped section defined by an upper strut extending from a back to a front portion of the motorcycle, a lower strut beneath and substantially parallel to the upper strut, and rear and front diagonal struts respectively connecting together the rear ends and the front ends of the upper and lower struts, said struts further defining a first vertex adjacent the rear end of said upper strut and second and third vertices respectively adjacent the rear and front ends of the lower strut and substantially in front of and below said first vertex, said suspension system including a swing arm carrying the rear wheel at one end thereof and pivotally mounted at its other end to the frame adjacent said second vertex, apparatus for mounting a sidecar to the motorcycle, comprising:
   three connectors each including
   a mounting bracket, and
   means carried by said mounting bracket for releasably attaching the sidecar to the mounting bracket; and
   means for securing the mounting brackets of said three connectors to the frame respectively adjacent said first, second and third vertices.

2. The sidecar mounting apparatus of claim 1 in which said frame section further includes an intermediate diagonal strut extending from adjacent the second vertex to the upper strut, and each of the mounting brackets comprises a plate spanning two of the struts of the motorcycle frame, and the securing means for each mounting bracket plate comprises a pair of securing elements, one of said pair of elements securing the mounting bracket plate to one of the struts spanned thereby and the other securing element securing the mounting bracket plate to the other of the struts spanned thereby.

3. The sidecar mounting apparatus of claim 2 in which each of said mounting bracket plates overlies a pair of struts on one side of the frame section and each of said securing elements overlies one of the spanned struts on the opposite side of the frame, said mounting bracket plates being clamped to the frame by said securing elements with each of the spanned struts being sandwiched between one of said securing elements and a portion of the mounting bracket plate.

4. The sidecar mounting apparatus of claim 3 in which the releaseable attaching means of each connector is carried by its mounting bracket plate between the pair of securing elements.

5. The sidecar mounting apparatus of claim 1 in which said frame section carries a motorcycle engine block adjacent said third vertex and the securing means includes means for securing one connector mounting bracket to both the engine block and one of the struts defining the third vertex, said one mounting bracket when so secured being the principal support thereat mounting the engine block to the frame.

6. The sidecar mounting apparatus of claim 5 wherein both the engine block and one of the struts defining the third vertex include means for securing an engine mount plate therebetween and the means for securing the mounting bracket to the frame adjacent the third vertex includes the engine mount securing means.

7. The sidecar mounting apparatus of claim 6 in which said bracket secured to the engine block includes a portion extending downwardly therefrom toward the third vertex that carries said attaching means, and said securing means includes means spaced from said engine mount securing means for clamping that portion of the bracket to one of the struts defining the third vertex.

8. The sidecar mounting apparatus of claim 5 in which said frame section further includes an intermediate diagonal strut extending from adjacent the second vertex to the upper strut, and each of the respective mounting brackets of the two connectors, other than said one connector secured to the engine block, comprises a plate spanning two of the struts of the motorcycle frame, and the securing means for each mounting bracket plate comprises a pair of securing elements respectively clamping the mounting bracket plate to the two struts spanned thereby.

9. A bracket assembly for mounting a sidecar to a motorcycle which has a frame member and an engine block mounted to the frame member by an engine mount overlying and secured to the engine block and the frame member by means including fasteners in coupling engagement within aligned holes in both the engine mount and the engine block and within aligned holes in the engine mount and the frame member, comprising:

a rigid member overlying the engine block and the frame member and having holes aligned with the holes in the engine block and the frame member;

means including fasteners extending through the holes in the rigid member and within the holes of the engine block and frame member aligned therewith for securing the rigid member to the engine block and the frame member; and means carried by said rigid member for releasably attaching the sidecar to the rigid member.

10. A method of mounting a sidecar to a motorcycle in which the engine block is secured to the frame member by means of an engine mount, comprising the steps of:

removing the engine mount;

securing a sidecar mounting bracket to the engine block and the frame member in place of the engine mount; and attaching the sidecar to the mounting bracket.

* * * * *